United States Patent

[11] 3,582,202

[72] Inventor Philip J. Donald
Woodbury, N.J.
[21] Appl. No. 750,884
[22] Filed Aug. 7, 1968
[45] Patented June 1, 1971
[73] Assignee RCA Corporation

[54] PROJECTION OF COLOR-CODED B AND W TRANSPARENCIES
8 Claims, 5 Drawing Figs.

[52] U.S. Cl. 353/20, 350/162, 353/31
[51] Int. Cl. G03b 21/14, G03b 21/00
[50] Field of Search 353/20, 30, 31, 32, 35, 36, 84; 350/162 SF; 95/12.2, .20, .21; 352/45

[56] References Cited
UNITED STATES PATENTS
3,078,338 2/1963 Glenn 178/5.4
3,478,661 11/1969 Heckschet 95/12.20

*Primary Examiner*—Leonard Forman
*Assistant Examiner*—Steven L. Stephan
*Attorney*—H. Christoffersen

ABSTRACT: A system including a light source and lens means for projecting a color image from a black and white transparency on which the image is diffraction-grating coded in different directions for respective different colors. The lens means acts on the light passing through the transparency to image the light source in a filter plane intermediate the transparency and a utilization plane, and acts on light passing through the transparency to image the transparency in the utilization plane. The light source is constituted of a large number of small light sources arranged in an array. A color decoding filter mask located in the filter plane includes many colored filter strips, the filter strips being related, dimensioned and oriented with reference to the imaged light sources so that all of the small individual light sources contribute to the brightness of the color image in the utilization plane.

PATENTED JUN 1 1971 3,582,202

INVENTOR
PHILIP J. DONALD

BY Carl V. Olson
ATTORNEY

PROJECTION OF COLOR-CODED B AND W TRANSPARENCIES

BACKGROUND OF THE INVENTION

In the field of graphic systems, it is often necessary to transmit, manipulate, modify, project, display and reproduce the graphic information. When the graphic information is polychromatic or a color image, transmission of the information over limited bandwidth communications channels is complicated and time consuming because of the need to transmit the various color components of the image. To simplify the transmission, it is known to transmit a color image in the form of a color-coded black and white image, from which the color image can be reconstituted at the receiving end of the transmission channel. If the color image is utilized at the receiving end to make color printing plates, the received color-coded black and white image may be successively decoded to produce three or four color separation negatives needed in the preparation of corresponding printing plates. When a color-coded black and white transparency is employed in a system, it is also necessary or desirable to employ the transparency to display or project the recorded image in color for monitoring purposes, or for photographically reproducing the image in color with a desired degree of enlargement.

It is known to expose black and white film through a color-coding diffraction grating or mask to record a color image in coded form on the black and white film. The film so exposed is developed photographically through a reversal process to form a black and white transparency. A reconstituted color image can be projected from the black and white transparency by illuminating the transparency with a point source light, and by interposing a filter mask in the optical path, including lenses, between the transparency and a viewing screen or utilization device. Known methods of projection have required the use of a small or point source of light which, being small, provides a limited amount of light. Consequently, the projected color image lacks a desired degree of brightness, particularly when the projected image is considerably larger than the transparency. Such a system is described in reissue U.S. Pat. No. 20,748, in the name of Cario Bocca and dated June 7, 1938. The use of a laser to provide a bright point source of light is unsatisfactory because of problems encountered due to the effects of dust and other imperfections in the optical path.

SUMMARY OF THE INVENTION

It is therefore a general object of this invention to provide an improved means for decoding a color-coded black and white transparency and projecting the color image at a much higher brightness level than was previously practical. This is accomplished, according to an example in the invention, by employing a light source constituted of a large number of small light sources arranged in a regular array. A color decoding filter mask is constructed with dimensions that are proportioned to the dimensions of the array of small light sources. The color decoding filter mask includes a number of spaced parallel colored filter strips for each color to be extracted, the filter strips of different colors being angularly related. All the elements are constructed and arranged with dimensions and geometries such that each small individual light source contributes to the brightness of the reconstituted color image.

DESCRIPTION OF THE PREFERRED EMBODIMENT

Figure 1:
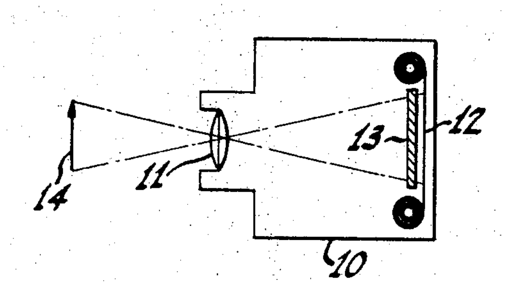
FIG. 1 is a representation of a camera for photographing a color image or scene on a black and white film so that the film records the brightness information and also the color information of the image.

Reference is now made to FIG. 1 showing a camera including an enclosure 10, a lens 11, a panchromatic black and white film 12 and a trichromatic spatial filter 13. The filter 13 is disposed in the path of light from image 14 impinging on film 12, and it is in close proximity with, or in contact with, film 12.

Figure 2:
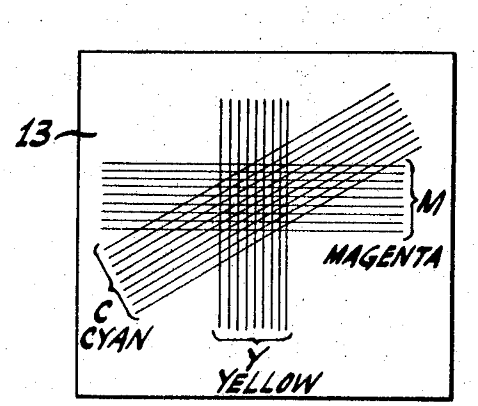
FIG. 2 is a representation of a trichromatic spatial color filter utilized in the camera of FIG. 1.

The filter 13 in the camera of FIG. 1 is represented in FIG. 2 as including a large number of vertical yellow filter strips Y, a large number of horizontal magenta filter strips M and a large number of diagonal cyan filter strips C. The three described sets of filter strips are in the three subtractive primary colors. The colored filter strips occupy the entire effective area of the filter 13, although only a limited number of the filter strips are included for reasons of clarity in the drawing of FIG. 2. The filter strips of each color are preferably very thin and close together to preserve image definition. There may be about 300 parallel spaced filter strips of one color per inch. The cyan filter strips C are shown disposed at 30° and 60° angles with the magenta and yellow filter strips, respectively. The particular angular relationships shown are advantageous but not essential. The image light of a given color going through a corresponding filter strip grating is recorded as closely spaced parallel lines on the black and white film. The parallel lines have an extent in area and a density corresponding with the extent and amount of the particular color in the original image.

Figure 3:
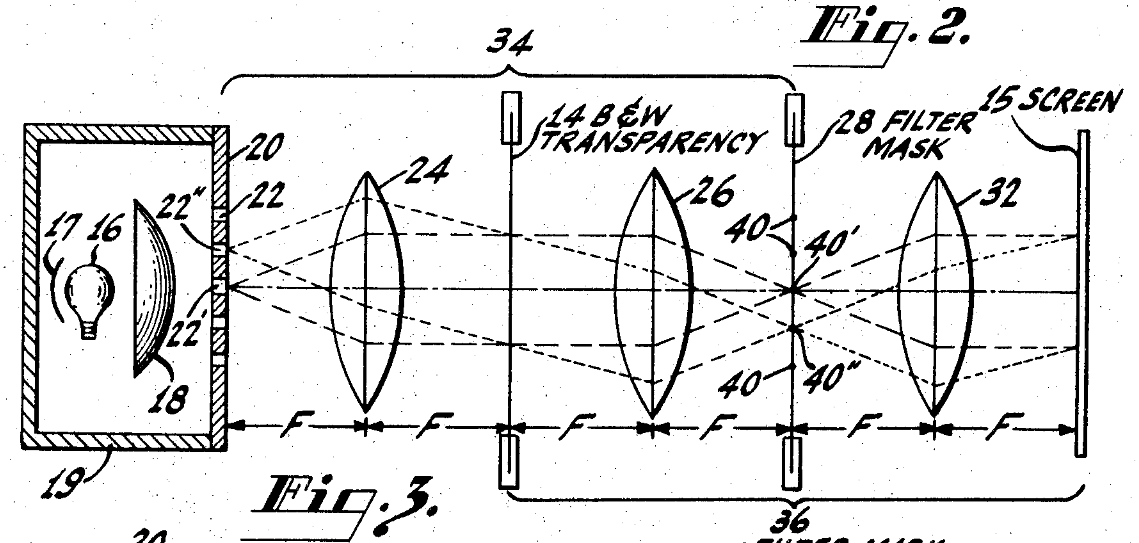
FIG. 3 is a representation of means for illuminating a color-coded black and white transparency made using the camera of FIG. 1, and for projecting therefrom a reconstituted color image.
Figure 4:
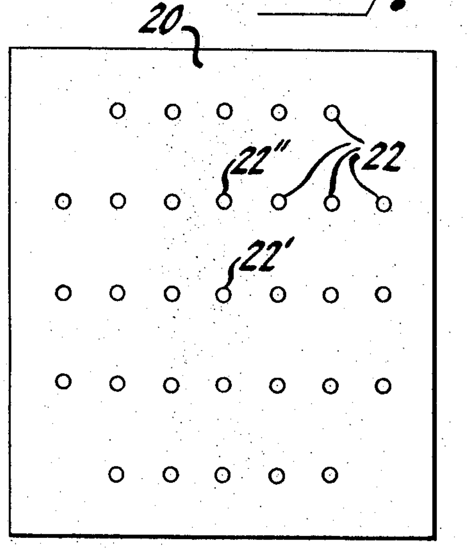
FIG. 4 is a diagram illustrating an array of small light sources used in the system of FIG. 3.

FIG. 3 illustrates a system for illuminating a black and white transparency 14 made with the camera of FIG. 1 and projecting a reconstituted color image onto a screen or utilization device 15. The system includes a large white light source 16, a back reflector 17 and a condenser lens 18 in an enclosure 19 having an apertured plate 20. The apertured plate 20, as shown in FIG. 4, includes a regular array of apertures 22 arranged in rows and columns. The rows and columns have a spacing such that diagonal lines drawn through centers of apertures make angles of 60° and 30° with the rows and columns, respectively. Each individual aperture may have a diameter of one thirty-second of an inch or 0.033 inches. The light from the large light source 16 in passing through the condenser 18 and in passing through the apertures 22, effectively provides an array of individual small light sources. Alternatively, fiber optics may be employed between the light source 16 and the apertures 22. According to another alternative construction, an array of small individual light bulbs may be arranged in, or in the place of, the apertures 22 to constitute the necessary array of small light sources.

The light from the apertures 22 is directed by a collimating lens 24 to the black and white transparency 14. Light passing through the transparency 14 is passed by lens 26 through a color decoding filter mask 28 and a lens 32 to the imaging screen 15. In the example of the invention shown in FIG. 3, the lenses 24, 26 and 32 have equal focal lengths F, and are positioned one focal length F on each side from adjacent elements in the optical path from the apertured plate 20 to the viewing screen 15. This being so, the apertured plate 20 is spaced from the color decoding filter mask 28 a distance 34 equal to four focal lengths F, with the result that the array of small light sources created by the apertured plate 20 is imaged with the same dimensions in the plane of the filter mask. Similarly, the distance 36 between the black and white transparency 14 and the viewing screen 15 is equal to four focal lengths F, with the result that the transparency is imaged on the viewing screen 15 in a 1 to 1 dimensional correspondence.

The system of FIG. 3 is illustrated with three lenses of equal focal length, and with equal spacing between elements in the optical path, for the purpose of simplifying the explanation of the operation of the system. Many other equivalent optical arrangements may be used. A larger or smaller number of lenses of different focal lengths, with appropriate spacing of the elements, may be used if desired. Different known arrangements, particularly as regards lens 32, may be preferred in order that the color image projected on the viewing screen 15 will be much large than the image on the black and white transparency 14.

In all suitable optical arrangements it is necessary that the array of small light sources constituted by the apertured plate 20 be imaged in the plane of the filter mask 28 in registry with the filter strip pattern on the filter mask 28. It is also necessary that the optical system image the transparency 14 on the display screen 15, or in a plane suitably positioned for viewing the virtual image.

Figure 5:
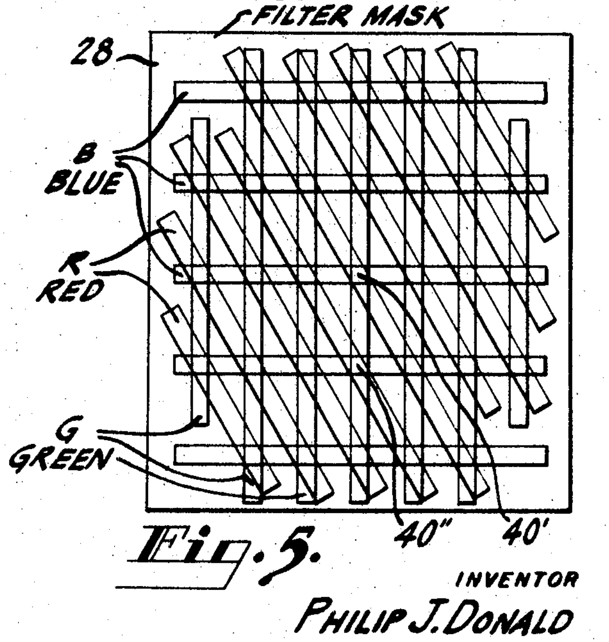
FIG. 5 is a diagram of a decoding color filter mask included in the system of FIG. 3.

The color decoding filter mask 28 in the system of FIG. 3 is shown in FIG. 5 to consist of spaced horizontal blue filter strips B, spaced vertical green filter strips G, and spaced diagonal red filter strips R. The red filter strips are oriented to make angles of 60° with the horizontal blue strips, and angles of 30° with the vertical green strips. The filter strips in FIG. 5 have common intersections located at spots where respective individual light sources are imaged. That is, one blue strip, one red strip and one green strip have one common intersection at a point where light from one of the small light sources is imaged. An intersection or crossover of three color filter strips blocks the passage of substantially all light therethrough. The array of light blocking intersections shown in FIG. 5 are registered for the image of the array of small light sources shown in FIG. 4. While it is not necessary that the array of light sources be exactly the same size as the array of intersections of the filter strips, it is convenient to make them so. The areas on the surface of the filter mask of FIG. 5 which are not occupied by any filter strip are preferably made opaque to prevent passage therethrough of stray light.

All the filter strips in FIG. 5 have the same width, which is substantially equal to the diameter of an imaged light source 22 in the plane of filter mask 28. The width of each strip and the diameter of each light source may be the same, and may, for example, be one thirty-second of an inch. The diagonal filter strips R are spaced apart an amount equal to their width. This being the case, and because of the 30°, 60° relationships, the vertical filter strips G are spaced apart a greater amount, and the horizontal filter strips B are spaced apart a still greater amount. The spacings of the vertical and horizontal filter strips are the same as, or in the same proportion as, the spacings of the columns and rows of the light sources 22 in the array of FIG. 4. Each light source in FIG. 4 is imaged at a corresponding intersection of R, G and B filter strips in FIG. 5.

The filter strips in the color decoding filter mask of FIG. 5 are filter strips in the three primary colors of the additive system, whereas the three color strips in the encoding mask of FIG. 2 are in the three primary colors of the subtractive system. The horizontal blue filter strips in FIG. 5 decode the color information produced by the vertical yellow filter strips in FIG. 2; the vertical green color strips in FIG. 5 reproduce the information coded by the horizontal magenta strips in FIG. 2; and the diagonal red color strips in FIG. 5 reproduce the color information encoded by the diagonal cyan color strips in FIG. 2.

In the operation of the color decoding and projection system of FIG. 3, the light from the central one 22′ of the small light sources takes paths within a volume illustrated by the dashed lines in going through the lens 24, transparency 14, lens 26, filter mask 28 and lens 32 to the viewing screen 15. Light from the source 22′ is shown as funneling through a point 40′ on the filter mask 28, which is also identified as a point 40′ in FIG. 5, where three color strips intersect. At point 40′, substantially all light from source 22′ is blocked and prevented from passing through because each of the three colors of light is blocked by two color filter strips of the other two primary colors.

However, light passing through the color-coded black and white transparency 14 is diffracted in left and right horizontal directions by the blue coded grating on the transparency so that the first order diffraction components pass through portions of the blue color filter strip in the filter mask of FIG. 5 adjacent to the intersection 40′ of the three color strips. The second order diffraction components desirably pass through portions of the blue color filter strip beyond the next adjacent filter strip intersections. Similarly, diffracted light representing red and green information passes through portions of the red and green filter strips on both sides of the intersection 40′. (A description of spatial domain filtering of light is given in mathematical and graphic terms in an article entitled "Optical Data Processing and Filtering Systems" by L.J. Cutrona et al. at pages 386—400 of the June 1960 issue of *IRE Transactions on Information Theory*.) The single small light source 22′ therefore results in the creation of a color image on the viewing screen 15. However, the image so produced lacks brightness because only a limited amount of light is available from the single small light source 22′.

Additional illumination is provided by another small light source 22″ from which light takes paths within a volume represented by the dotted lines in FIG. 3. Light from source 22″ illuminates the same region of the transparency 14 and it projects the image thereon to the same region of the viewing screen 15. However, light from the small source 22″ goes through point 40″ in the plane of the filter mask 28. The point 40″ is shown in FIG. 5 to be also an intersection of blue, red and green filter strips which block all light from passing therethrough. However, the first and higher order diffraction terms representing the color information in the transparency 14 pass through adjacent portions of individual color filter strips to recreate the image in color on the viewing screen 15.

What has been said about the light source 22″ in relation to the point 40″ on the filter mask can be said also of all the other individual light sources 22 in relation to corresponding points on the filter mask 28. Every one of the light sources 22 contributes to the brightness of the image projected on the viewing screen 15. The brightness of the reproduced image is thus increased in proportion to the number of individual light sources employed. The greatly increased brightness is accomplished by the relatively simple and inexpensive means described.

What I claim is:

1. A system including a light source and lens means for projecting a color image from a black and white film on which the image is diffraction coded in different directions for respective different colors, the lens means acting on the light passing from the film to image the light source in a filter plane intermediate the film and a utilization plane, and acting on light passing from the film to image the film in the utilization plane, wherein the improvement comprises a light source means constituted of a large number of small light sources arranged in an array, and a color decoding filter mask located in said filter plane, said filter mask including colored filter strips, the filter strips of each one color being parallel to each other and having a direction related to the direction of diffraction coding for the respective color, and the filter strips of different colors having common intersections located at spots where respective light sources are imaged, whereby all of the small individual light sources contribute to the brightness of the color image in the utilization plane.

2. The combination as defined in claim 1 wherein the intersections of filter strips of different colors form substantially opaque spots.

3. The combination as defined in claim 1 wherein said filter strips of different colors make angles of 90°, 60° and 30° with each other.

4. The combination as defined in claim 1 wherein said filter mask is opaque in regions between said filter strips.

5. The combination as defined in claim 1 wherein said filter strips have a width substantially equal to the diameter of the image of an individual light source at said filter plane.

6. The combination as defined in claim 5 wherein the individual light sources of the array are arranged in rows and columns, the spacing of the rows being sufficiently different from the spacing of the columns so that a diagonal line through sources in the array makes angles of substantially 30° and 60° with the rows and columns.

7. The combination as defined in claim 1 wherein light passing through said film includes first order diffraction components, and wherein the spacing between filter strip intersections is greater than the displacement at the filter plane of the first order diffraction components.

8. The combination as defined in claim 7 wherein light passing through said film includes second order diffraction components, and wherein the spacing between filter strip intersections is less than the displacement at the filter plane of the second order diffraction components.

Disclaimer 3,582,202.—*Philip J. Donald*, Woodbury, N.J. PROJECTION OF COLOR-CODED B AND W TRANSPARENCIES. Patent dated June 1, 1971. Disclaimer filed May 12, 1972, by the assignee *RCA Corporation*.

Hereby enters this disclaimer to all claims of said patent.

[*Official Gazette February 19, 1974.*]